United States Patent
Lee et al.

(10) Patent No.: US 7,123,333 B2
(45) Date of Patent: Oct. 17, 2006

(54) COLOR FILTER PANEL AND ITS FABRICATION METHOD USING BACK EXPOSURE

(75) Inventors: Dong-Hoon Lee, Gyungsangbuk-Do (KR); Jae-Seok Park, Gyungsangbuk-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 45 days.

(21) Appl. No.: 10/825,414

(22) Filed: Apr. 16, 2004

(65) Prior Publication Data

US 2005/0110922 A1 May 26, 2005

(30) Foreign Application Priority Data

Nov. 24, 2003 (JP) .................. 10-2003-0083772

(51) Int. Cl.
*G02F 1/1339* (2006.01)
(52) U.S. Cl. ..................................... 349/156
(58) Field of Classification Search ................. 349/156
See application file for complete search history.

(56) References Cited

U.S. PATENT DOCUMENTS

| | | | |
|---|---|---|---|
| 5,712,065 A | | 1/1998 | Chiang |
| 5,793,457 A | * | 8/1998 | Tamai et al. ................. 349/110 |
| 5,828,434 A | * | 10/1998 | Koden et al. ................. 349/148 |
| 5,880,803 A | * | 3/1999 | Tamai et al. ................. 349/156 |
| 5,925,484 A | | 7/1999 | Shima et al. |
| 6,147,729 A | | 11/2000 | Kurauchi et al. |
| 6,323,921 B1 | | 11/2001 | Kurauchi et al. |
| 6,392,735 B1 | | 5/2002 | Tani |
| 6,577,374 B1 | | 6/2003 | Nakata et al. |
| 2001/0007733 A1 | | 7/2001 | Matsuyama et al. |
| 2005/0099580 A1 | * | 5/2005 | Lee et al. ................... 349/156 |

FOREIGN PATENT DOCUMENTS

| | | |
|---|---|---|
| JP | 7-181316 A | 7/1995 |
| JP | 8-95021 A | 4/1996 |
| JP | 9-197120 A | 7/1997 |
| JP | 9-230124 A | 9/1997 |
| JP | 10-160927 A | 6/1998 |
| JP | 10-197713 A | 7/1998 |
| JP | 10-221696 A | 8/1998 |
| JP | 10-239513 A | 9/1998 |
| JP | 11-212076 A | 8/1999 |
| JP | 2000-29206 A | 1/2000 |
| JP | 2000-75305 A | 3/2000 |
| JP | 2001-108815 A | 4/2001 |
| JP | 2002-131902 A | 5/2002 |
| JP | 2002-236210 A | 8/2002 |
| JP | 2003-15294 A | 1/2003 |
| JP | 2003-177228 A | 6/2003 |

* cited by examiner

*Primary Examiner*—James A. Dudek
(74) *Attorney, Agent, or Firm*—Birch, Stewart, Kolasch & Birch, LLP

(57) ABSTRACT

A fabrication method for a color filter panel of a display device is provided. The method includes forming a black matrix layer having a first opening on a substrate; forming a color filter layer on the substrate; forming an organic layer on the color filter layer and in the first opening; and forming a spacer by back-exposing the organic layer through the first opening.

11 Claims, 5 Drawing Sheets

COLOR FILTER PANEL AND ITS FABRICATION METHOD USING BACK EXPOSURE

The present application claims, under 35 U.S.C. § 119, the priority benefit of Patent Application No. 2003-83772 filed in Republic of Korea on Nov. 24, 2003, the entire contents of which are herein fully incorporated by reference.

BACKGROUND OF THE INVENTION

1. Field of the Invention

The present invention relates to a fabrication method of a liquid crystal display (LCD) device, and more particularly, to a fabrication method of an LCD device for forming a color filter panel with a reduced number of mask processes.

2. Description of the Related Art

Generally, an LCD device is for displaying an image by using a liquid crystal driven by an applied signal, and is largely composed of an upper plate, a lower plate, and a liquid crystal between the upper and lower plates.

The upper plate is generally known as a color filter substrate/panel for displaying an image in colors. The lower plate is generally known as a thin film transistor (TFT) array substrate/panel having unit pixels arranged in a matrix form and provided with TFTs at each unit pixel as a switching device.

The structure of an LCD panel constituted with an upper plate 200 and a lower plate 100 will be explained with reference to FIG. 1.

As shown in FIG. 1, in the lower plate (TFT array panel) 100, a plurality of gate lines 101 arranged in parallel cross perpendicularly a plurality of data lines 102 arranged in parallel on a lower substrate 105. Intersection regions between the gate lines 101 and the data lines 102 are defined as unit pixel regions, where the unit pixel regions are arranged in a matrix form on the lower substrate 105. At each intersection region between the gate lines 101 and the data lines 102, a switching device 103 for driving the corresponding unit pixel is formed. As the switching device, a TFT is generally used. The TFT includes a gate electrode, a source electrode, a drain electrode, and a channel layer. The gate electrode and the source/drain electrodes are respectively connected to the corresponding gate line 101 and the corresponding data line 102.

For each unit pixel region, a pixel electrode 104 for applying an electric field to a liquid crystal 110 is formed at the lower substrate 105. An alignment layer (not shown) for the initial alignment of the liquid crystal 110 is formed on the pixel electrodes 104 over the entire surface of the lower substrate 105. As the alignment layer, a polyimide-based organic layer is used. The initial alignment of the liquid crystal 110 is performed by depositing the alignment layer and performing a rubbing process for rubbing the alignment layer with cotton.

A spacer (not shown) for evenly maintaining a gap between the lower plate 100 and the upper plate 200 is arranged on the alignment layer. A sealant for bonding the upper plate 200 and the lower plate 100 and preventing the liquid crystal 110 from being leaked is formed at the periphery of the pixel region of the lower plate 100.

The structure of the upper plate 200 opposing the lower plate 100 and displaying information in colors will be explained.

In the upper plate 200, a black matrix 202 for shielding unnecessary light among the light irradiated from the lower plate 100 is provided in a matrix form. On the black matrix 202, a color filter layer 203 for displaying an image in colors is provided. The color filter layer 203 is composed of R, G, and B sub color filter layers each corresponding to one of the unit pixel regions.

An overcoat layer 204 for compensating any step in the color filter layer 203 may be provided on the color filter layer 203. A common electrode 205 for applying an electric field to the liquid crystal 110 with the pixel electrodes 104 formed at the lower plate 100 is provided on the overcoat layer 204. On the common electrode 205, an alignment layer (not shown) for the initial alignment of the liquid crystal 110 is provided. A spacer (not shown) for maintaining a cell gap between the upper plate 200 and the lower plate 100 may be provided on this alignment layer. As known, a spacer can be provided either at the upper plate 200 or at the lower plate 100.

FIG. 2 shows the structure of the upper plate (color filter panel) 200 of the LCD device of FIG. 1 in more detail.

Referring to FIG. 2, on a substrate 201 of a transparent material, the black matrix 202 is provided. The black matrix 202 is formed of a metal thin film or a resin, and is arranged in a matrix form so as to correspond to the gate lines 101 and data lines 102 formed on the lower substrate 105. A color resin as the color filter layer 203 for displaying an image in colors is formed in a pixel region defined by the black matrix 202. The color resin is composed of R, G, and B colors, and is arranged to correspond to each unit pixel. On the color filter layer 203, the transparent overcoat layer 204 for compensating steps in the color filter layer 203 and protecting the color filter layer 203 is provided. On the overcoat layer 204, the common electrode 205 composed of a transparent material for applying an electric field to the liquid crystal 110 is provided. On the common electrode 205, a spacer 206 for maintaining a cell gap of the LCD device is formed. On the spacer 206, an alignment layer 207 for the initial alignment of the liquid crystal 110 injected between the color filter panel 200 and the TFT array panel 100 is provided.

The fabrication process of the color filter panel 200 of FIG. 2 will be explained in more detail with reference to FIGS. 3A to 3D.

Generally, a metal material or a resin for forming a black matrix is formed on a transparent substrate. The black matrix is formed between R, G, and B sub color filter layers and shields light passing through a reverse tilt domain formed at the periphery portion of a pixel electrode of a TFT array panel. As the material of the black matrix, a metal thin layer such as Cr having an optical density more than 3.5 or an organic material such as carbon are generally used. A double layer such as Cr/CrOx may be used for a low reflection. In case of using a metal thin layer, the black matrix may be formed in a certain pattern by a photolithography process applying an exposure process using a mask. On the other hand, in case of using a resin of an organic material, the black matrix may be formed in a certain pattern by an exposure process using a mask and a development process.

More specifically, FIG. 3A shows the black matrix 202 of a certain pattern formed on the substrate 201. In order to form the black matrix 202 on the substrate 201, a first mask including a black matrix pattern is needed and used.

After forming the black matrix 202, as shown in FIG. 3B, the color filter layer 203 composed of R, G, and B colors for displaying an image in colors is formed. The color filter layer 203 composed of R, G, and B sub color filter layers is formed such that each sub color filter layer corresponds to one of the unit pixels. The color filter layer 203 can be fabricated by using one of several methods such as a dyeing method, an electrodepositing method, a pigment dispersing method, a printing method, etc. Herein, the fabrication method of the color filter layer 203 by using the pigment dispersing method will be explained.

According to the pigment dispersing method, first, one of R, G, and B color resins is deposited on the substrate 201 where the black matrix 202 is formed. Here the color resins are deposited in the order of R, G, and B colors. Then, a selective exposure is performed on the resulting structure thereby to form a red sub color filter layer 203a. Then, a green color resin is deposited on the substrate 201 having the red sub color filter layer 203a, and a selective etching is performed thus to pattern and form a green sub color filter layer 203b at a corresponding region. Then a blue color resin is deposited and selectively etched to form a blue sub color filter layer 203c.

Alternatively, the color filter layer 203 may be formed by applying a second mask and repeating the exposure process. That is, in order to form the R, G, and B sub color filter layers 203a, 203b, 203c, the mask process composed of an exposure, a development, and a cleaning is performed three times.

After forming the color filter layer 203 by performing the mask process three times, as shown in FIG. 3C, the transparent overcoat layer 204 of an organic layer for compensating the steps in the color filter layer 203 is formed. If an organic layer is used as the black matrix 202, the overcoat layer 204 is absolutely necessary since the steps in the color filter layer 203 are greatly generated. But if a metal thin film is used as the back matrix 202, the overcoat layer 204 may not be needed since the black matrix 202 is formed as a thin film.

After forming the overcoat layer 204, a transparent electrode as an indium tin oxide (ITO) layer for applying an electric field to the liquid crystal 110 is formed. This ITO layer serves as the common electrode 205.

Then, the spacer 206 for maintaining a cell gap of the LCD device is formed on the common electrode 205. The spacer 206 is formed by using a dispersion method for dispersing balls on the substrate or by using a patterning method which can be used to vary the size, height and position of the spacer parts.

The dispersion method is divided into a wet dispersion method for dispersing a spacer by mixing with alcohol, and a dry dispersion method for dispersing only the spacer. The dry dispersion method includes a static dispersion method using static electricity and an antistatic dispersion method using gas pressure. The antistatic dispersion method is mainly used in the liquid crystal cell structure susceptible to static electricity. By the dispersion method, the size, the height, and the position of the dispersed spacer balls may not be varied, but a column spacer or a patterned spacer for increasing an opening ratio is used.

According to the patterning method for the spacer 206, a photosensitive resin is deposited on the common electrode 205 and an exposure process using a mask, a development process, and a cleaning process are performed thereto to form the spacer 206 of a certain pattern. Thus, to form the spacer 206, additional mask processes are required.

After forming the spacer 206 on the common electrode 205, an organic layer such as polyimide is deposited thereon for the initial alignment of the liquid crystal, and a rubbing is performed in a certain direction thus to form the alignment layer 207. This completes the fabrication of the color filter panel of the LCD device.

However, as aforementioned, since a large number of mask processes are required at the time of fabricating the related art color filter panel, the processes are delayed and the productivity of the LCD device is reduced. One mask process includes a series of processes such as a deposition process of a photosensitive resin, an exposure process, a cleaning process, etc. Therefore, it is advantageous to reduce the number of mask processes needed, so as to reduce the fabrication cost of the LCD device and to enhance the productivity of the LCD device.

SUMMARY OF THE INVENTION

Accordingly, the present invention provides a fabrication method for a color filter panel of an LCD device which overcomes the problems and limitations of the related art fabrication methods.

Further, an object of the present invention is to provide a fabrication method of a color filter panel capable of simplifying the process by reducing the number of masks used and capable of reducing the fabrication cost.

To achieve these and other advantages and in accordance with the purpose of the present invention, as embodied and broadly described herein, there is provided a fabrication method for a color filter panel of a display device, the method comprising: forming a black matrix layer having a first opening on a substrate; forming a color filter layer on the substrate; forming an organic layer on the color filter layer and in the first opening; and forming a spacer by back-exposing the organic layer through the first opening.

To achieve these and other advantages and in accordance with the purpose of the present invention, as embodied and broadly described herein, there is also provided a color filter panel for a display device, the color filter panel comprising: a substrate; a black matrix layer on the substrate and having a first opening; a color filter layer on the substrate; and a spacer in the first opening.

To achieve these and other advantages and in accordance with the purpose of the present invention, as embodied and broadly described herein, there is also provided a display device comprising: a thin film transistor (TFT) array panel; a color filter panel; and a liquid crystal layer between the TFT array panel and the color filter panel, wherein the color filter panel includes a substrate, a black matrix on the substrate and having a first opening, a color filter layer on the substrate, and a spacer in the first opening.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, the structure of a color filter panel of a display device such as an LCD device according to one embodiment of the present invention will be explained with reference to FIGS. 4 to 5.

Figure 4:
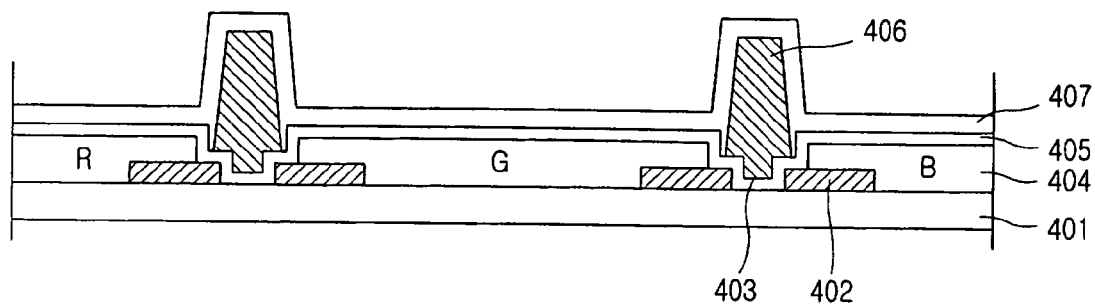
FIG. 4 is a sectional view showing a structure of a color filter panel of an LCD device according to one embodiment of the present invention.

FIG. 4 is a sectional view showing the structure of a color filter panel of an LCD device according to one embodiment of the present invention. As shown, an opaque black matrix 402 of a matrix arrangement is formed on a transparent substrate 401. Through the parts of the black matrix 402, a plurality of first openings 403a for passing the light irradiated from the TFT array panel are formed. As the material for the black matrix 402, Cr, CrOx, or polymer resin may be used.

On the substrate 401 including the black matrix 402 having the first openings 403a, a color filter layer 404 constituted with R, G, and B sub color filter layers is provided. These R, G, and B sub color filter layers correspond to unit pixels. The color filter layer 404 is formed between the strips of the black matrix 402 and on parts of the black matrix 402, or only between the strips of the black matrix 402. Through the parts of the color filer layer 404, a plurality of second openings 403b each connected directly to the corresponding first opening 403a are formed. The second openings 403b are formed to have a size equal to or larger than the first openings 403a.

A common electrode 405 for applying an electric field to a liquid crystal is formed over the color filter layer 404 and in the first and second openings 403a and 403b. The common electrode 405 may be composed of an indium tin oxide (ITO) or an indium zinc oxide (IZO) which are transparent electrodes.

A spacer 406 for maintaining a cell gap of the LCD device is formed on the common electrode 405 in the openings 403 (403a and 403b. The spacer 406 may be formed with various area densities according to the size of the liquid crystal display panel, and can have various patterns, shapes and sizes. For instance, the spacer 406 can be composed of a plurality of spacer parts such as projections, ball-shaped parts, etc. An alignment layer 407 for the initial alignment of the liquid crystal is formed on the spacer 406.

The spacer 406 may be formed over the black matrix 402 and at the same time at common corner regions between the sub color filter layers of the color filter layer 404. Therefore, the openings 403 may be formed at the common corner regions between the R, G, and B sub color filter layers. According to the position of the spacer parts of the spacer 406, the position of the openings 403 is determined. The spacer 406 is preferably opaque so that the light may not leak through the openings 403.

The color filter layer 404 may be an island type where the sub color filter layers are separated from one another, or a stripe type where the same sub color filter layers are formed in columns.

In case of forming the common electrode 405 on the color filter layer 404, the spacer 406 is in contact with the substrate 401 as the common electrode 405 is positioned between the spacer parts of the spacer 406. Therefore, the spacer 406 is formed of an opaque material so as not to pass the light irradiated from the lower substrate of the TFT array panel.

Figure 5:
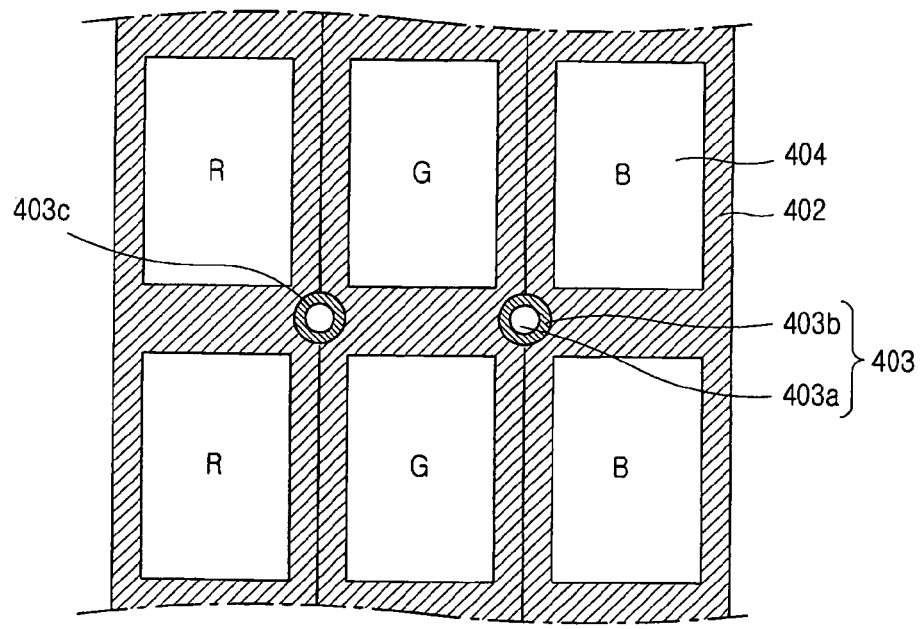
FIG. 5 is a top plane view showing the structure of the color filter panel of FIG. 4 according to the one embodiment of the present invention.

FIG. 5 is a top plane view showing the structure of the color filter panel of FIG. 4. Here, certain parts (such as the spacer 406) of the color filter panel in FIG. 4 are not shown to better illustrate the openings 403. Each element 403 is composed of the first opening 403a formed at the black matrix 402 and the second opening 403b formed at the color filter layer 404. As shown, the first openings 403a are preferably formed in the black matrix 402, especially at each common corner region 403c of the sub color filter layers. However, the position of the openings 403 is not limited to such common corner regions.

The fabrication process of the color filter panel in FIGS. 4 and 5 will be explained in more detail with reference to FIGS. 6A to 6E according to the present invention.

Figure 6A:
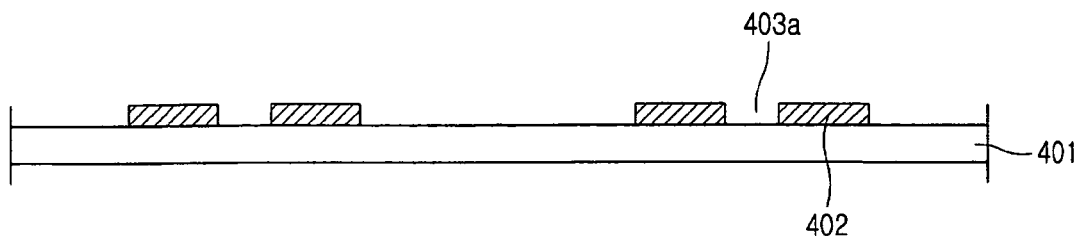
FIGS. 6A to 6E are views showing a fabrication process of the color filter panel of FIG. 4 according to an embodiment of the present invention.

As shown in FIG. 6A, the black matrix 402 including the first openings 403a is formed on the transparent substrate 401. The black matrix 402 including the first openings 403a may be formed through a step of forming a thin film of a black matrix material on the substrate, a step of depositing a photoresist (not shown) on the thin film of the black matrix material, and a step of photo-etching by applying a mask including an opening pattern corresponding to the first openings 403a. In case that a metal such as Cr or CrOx is used as the black matrix material, the photo-etching effective to form a metal pattern may be applied. In case that a carbon black resin of a photosensitive organic layer is used as the black matrix material, an exposure process using a mask including the opening pattern corresponding to the first openings 403a, and a development process are performed thus to form the black matrix 402 including the first openings 403a.

Figure 6B:
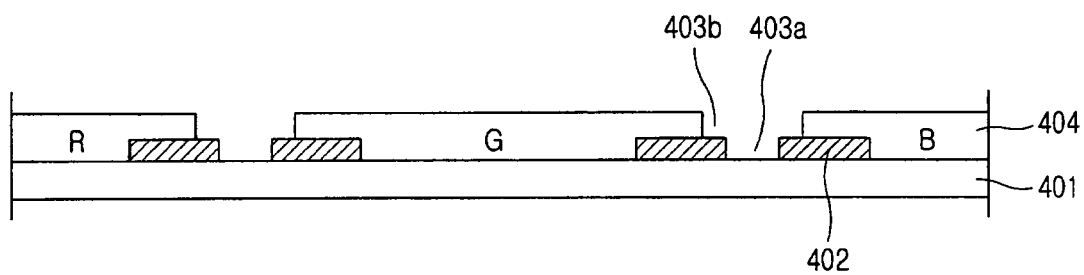

Then, as shown in FIG. 6B, the color filter layer 404 including the second openings 403b is formed. The color filter layer 404 constituted with the R, G, and B sub color filter layers is formed to correspond to the unit pixel regions. The color filter layer 404 is fabricated by one of several methods such as a dyeing method, an electrodepositing method, a pigment dispersing method, a printing method, etc. Herein, the fabrication method of the color filter layer 404 by the pigment dispersing method will be explained.

According to the pigment dispersing method, first, the R color resin is deposited on the entire substrate 401 where the black matrix 402 has been formed. Then, a selective exposure is performed on the resulting structure thereby to form a red sub color filter layer. Then, a green color resin is deposited on the substrate where the red sub color filter layer has been formed, and a selective etching is performed thus to pattern and form a green sub color filter layer at a corresponding region. This process is repeated for the blue color to form a blue sub color filter layer. In this example, the color resins are deposited and formed in the order of R, G, B colors, but can be formed in other order if desired. Also, the sub color filter layer may be an island type such that the sub color filter layers are separated from one another, or may be a stripe type such that the same sub color filter layers are formed as a series.

During one process among the processes for forming the R, G, and B sub color filter layers, the second openings 403*b* are simultaneously formed. For instance, in case that the sub color filter layers of a stripe type are used, the second openings 403*b* above the first openings 403*a* can be formed by arranging the sub color filter layers to define the second openings 403*b* therebetween. Also, in case that adjacent sub color filter layers are overlapped, the second openings 403*b* may be formed at the overlapped sub color filter layer regions. FIGS. 5 and 6B show the second openings 403*b* formed by arranging the adjacent sub color filter layers to define the openings 403*b*.

On the contrary, if the sub color filter layers are formed as an island type, the color filter layer 404 may not be formed on the black matrix 402, but only between the strips of the black matrix 402. In this case, only the first openings 403*a* are formed through the black matrix 402, no second openings 403*b* exist, and only the first openings 403*a* may be used as a spacer forming hole.

Figure 6C:
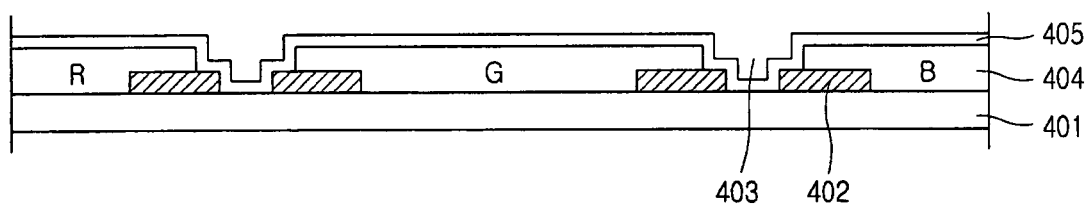

As shown in FIG. 6C, the common electrode 405 for applying an electric field to the liquid crystal is further formed on the color filter layer 404 including the openings 403. The common electrode 405 is formed of a transparent electrode such as an ITO or an IZO. The common electrode 405 in the color filter panel may be provided at an LCD device operated by a twisted nematic (TN) mode. However, the common electrode may not be formed in the color filter panel if the LCD device is operated in an in-plane switching mode where a common electrode is formed on the TFT array panel. In order to prevent external static electricity from damaging the LCD device, it is also possible to form an ITO layer at the back surface or the upper surface of the color filter panel and then to perform a color filter process.

Figure 6D:
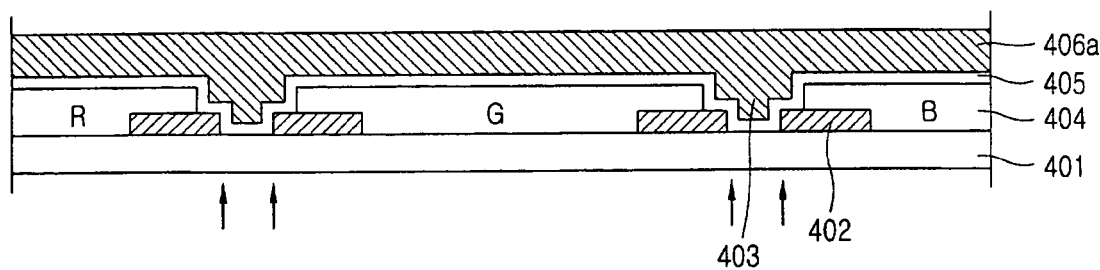

As shown in FIG. 6D, an organic layer 406*a* is formed on the common electrode 405. The organic layer 406*a* is for forming the spacer 406, and is photosensitized by a back exposure through the openings 403*a* and 403*b*.

Particularly, after forming the organic layer 406*a*, ultraviolet rays are irradiated from the back surface of the substrate 401 onto the organic layer 406*a*, thus to perform a back exposure. In this example, the organic layer 406*a* is a negative type such that an exposed region of the organic layer 406*a* is hardened, but a positive type can also be used. The color filter layer 404 includes an ultraviolet ray absorbent material or layer to prevent the ultraviolet light from reaching portions of the organic layer 406*a* above the color filter layer 404 at the time of the back exposure.

In another example, the back-exposure may be performed by using a glass filter for passing only a certain wavelength and without the use of the ultraviolet ray absorbent material in the color filter layer 404. For instance, a glass filter is placed below the substrate 401 and is back-exposed. The glass filter passes the rays having a wavelength of less than 360 nm in the ultraviolet ray region so as to shield or block out the near blue wavelength of 360 nm or above in the ultraviolet ray region. Since the organic layer 406*a* for forming the spacer 406 includes initiators that react to the light having a wavelength in the range of, e.g., 320 nm~360 nm, the filter glass is used to shield the light of at least 360 nm in the ultraviolet ray region to prevent certain portions of the organic layer 406*a* from reacting to the ultraviolet rays, so as to pattern the spacer 406.

After the back-exposure, the organic layer 406*a* is developed and cleaned to remove certain portions of the organic layer 406*a* and thereby form the spacer 406. A predetermined number of spacer parts of the spacer 406 may be formed at each unit pixel with various forms according to a model. In order to prevent unnecessary light from being leaked from the back surface through the openings 403, the spacer 406 may be formed of an opaque organic layer for shielding the light.

Figure 6E:
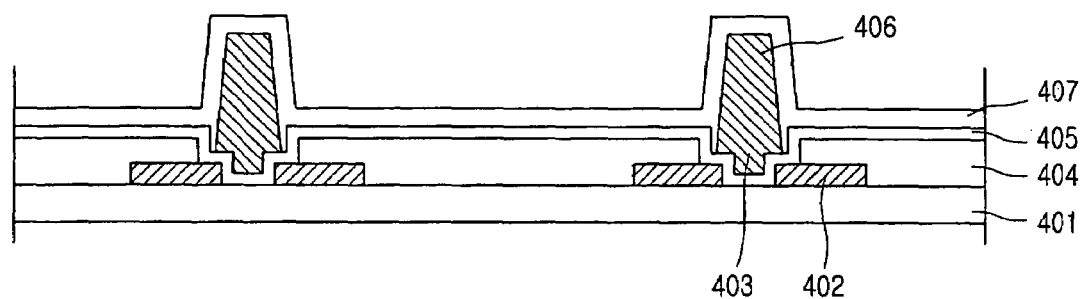

As a result, as shown in FIG. 6E, the spacer 406 is formed in the openings 403. In the present invention, the first openings 403*a* in the black matrix 402 and/or the second openings 403*b* at the color filter layer are formed so that the back exposure may be used to form the spacer 406.

Next, the alignment layer 407 for the initial alignment of the liquid crystal is formed on the spacer 406 and the common electrode 405. As a material for the alignment layer 407, a polyimide-based resin may be used. This completes the fabrication of the color filter panel according to the present invention.

By the present fabrication method, the spacer 406 is formed by using the back exposure and without the use of an additional mask and the mask process.

Furthermore, the first openings 403*a* formed in the black matrix 402 and the second openings 403*b* formed in the color filter layer 404 may be formed only by further forming the opening pattern at the mask without an additional process, thereby simplifying the entire fabrication method of the color filter panel.

Figure 7:
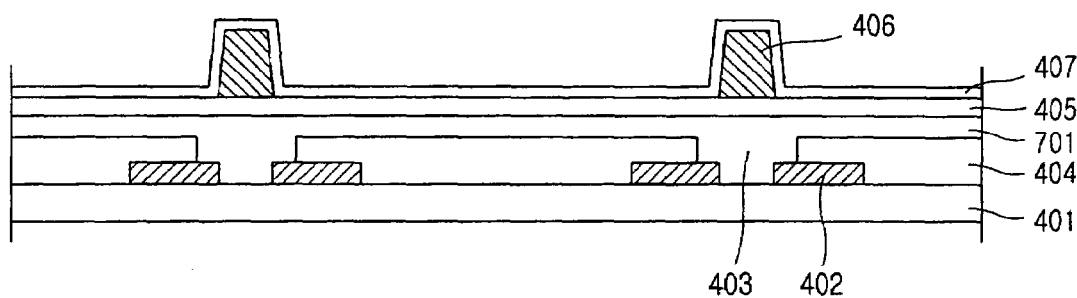
FIG. 7 is a sectional view of the color filter panel including an overcoat layer according to one embodiment of the present invention.

FIG. 7 is a sectional view showing the structure of the color filter panel according to another embodiment of the invention. The color filter panel of FIG. 7 is identical to that of FIG. 6, except that the step of forming an overcoat layer 701 is added. As shown in FIG. 7, to compensate for a severe step in the color filter layer 404, the transparent overcoat layer 701 is formed over the color filter layer 404, over the black matrix 402, and in the openings 403, so as to planarize the resultant color filter panel structure. Then the common electrode 405, the spacer 406, and the alignment layer 407 are formed as discussed above in connection with FIGS. 6C–6E.

Figure 1:
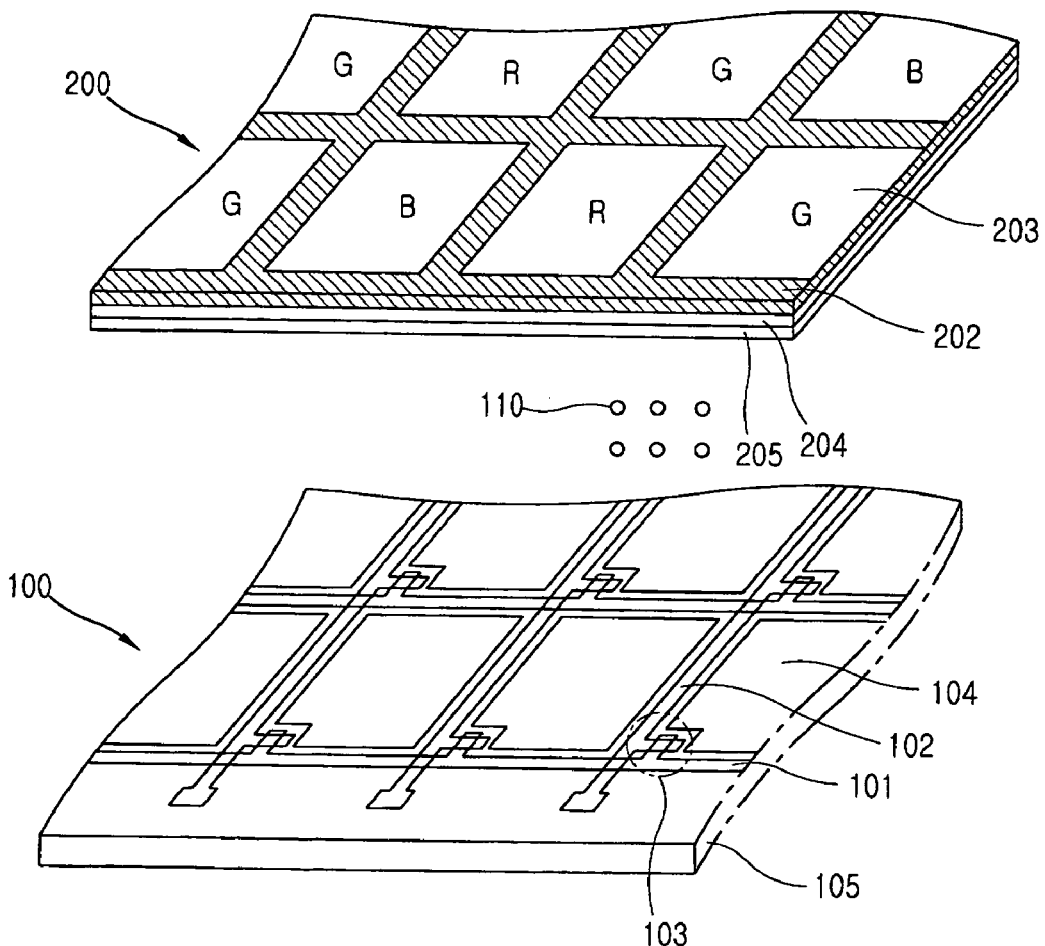
FIG. 1 is a perspective view showing a schematic construction of a liquid crystal display (LCD) device in accordance with the related art.
Figure 2:
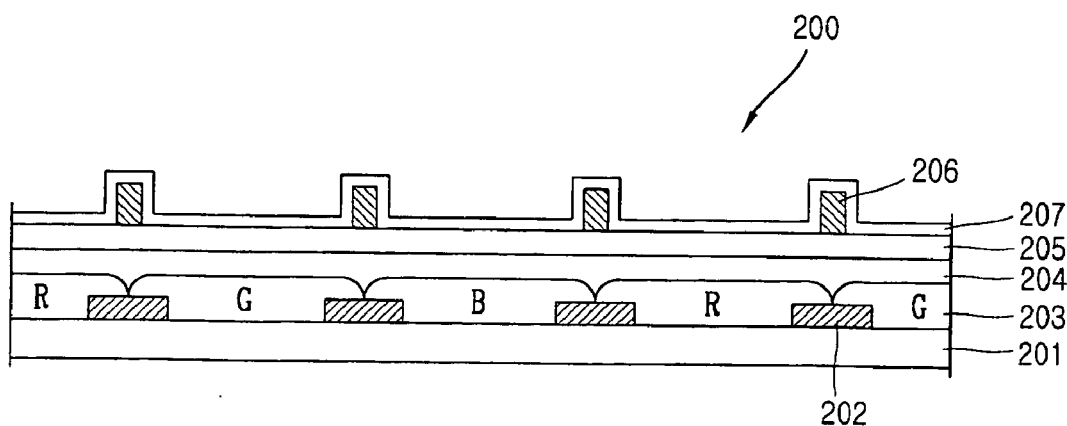
FIG. 2 is a sectional view showing the structure of the color filter panel of the LCD device of FIG. 1.
Figure 3A:
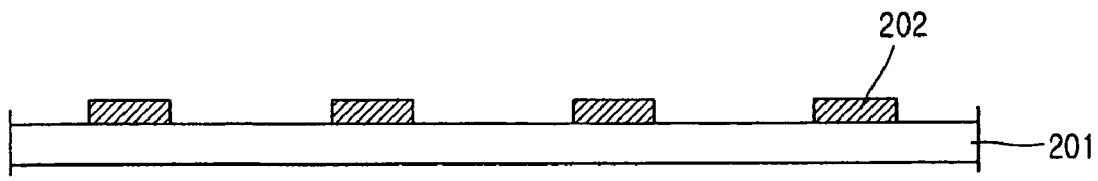
FIGS. 3A to 3D are views showing the fabrication process of the color filter panel of FIG. 2.
Figure 3B:
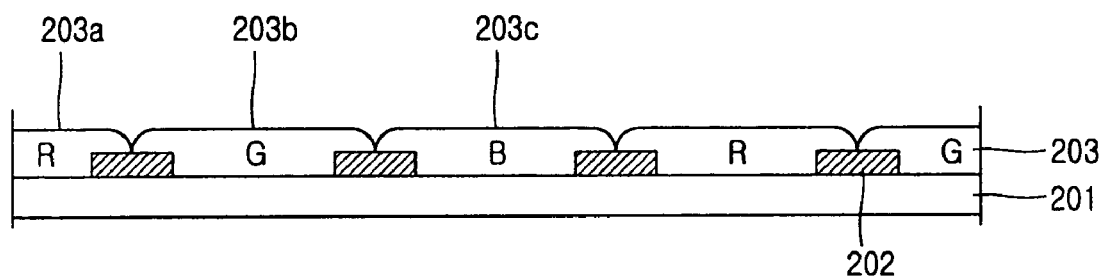
Figure 3C:
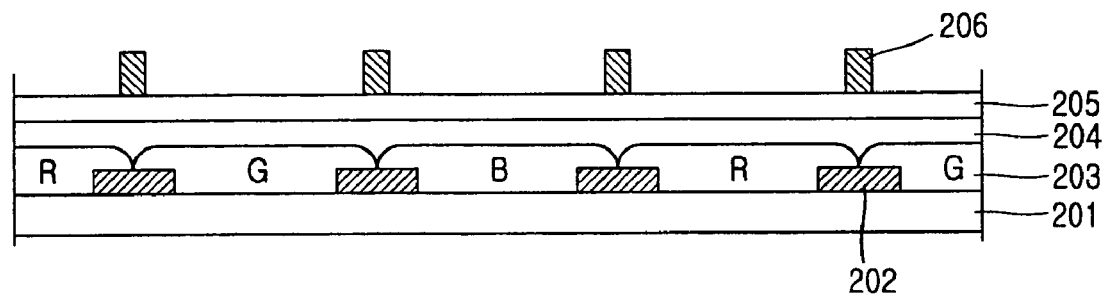
Figure 3D:
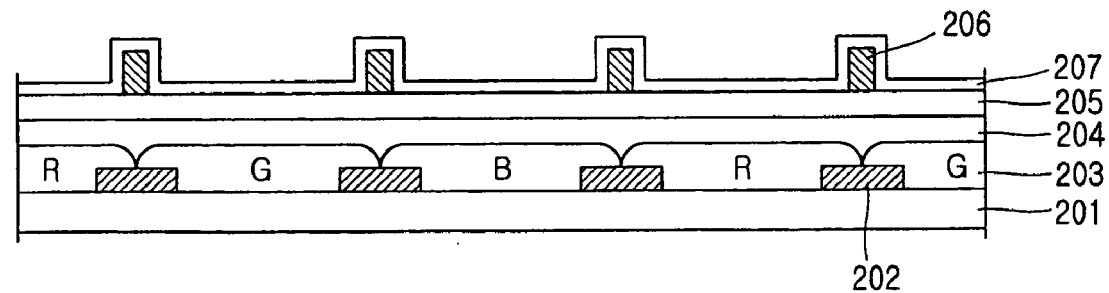

It is understood that the present LCD devices mentioned in connection with FIGS. 4–7 include elements generally present in related art LCD devices. For example, the present LCD device includes the related art TFT array panel such as one shown in FIG. 1, a liquid crystal layer between the TFT array panel and the present color filter panel, driving circuits, etc.

In the present invention, the first openings are 403*a* formed at predetermined portions of the black matrix 402 where the spacer 406 is to be formed, and the second openings 403*b* are, optionally, formed between the portions of the color filter layer 404 and directly above the first openings. These first and second openings, or just the first openings if no second openings are formed because, e.g., the color filter layer does not overlap the black matrix, are then used to effectively fabricate the spacer by using the back-exposure without the use of an additional spacer-forming mask. By reducing the number of masks used, the entire process for the color filter panel fabrication is simplified, the fabrication cost is reduced, and thereby the productivity of the color filter panel is increased. Where the spacer can be formed by the back exposure through the openings, the present invention may be applied regardless of whether or not the color filter panel includes the common electrode and regardless of whether or not the color filter panel is provided with the overcoat layer.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A fabrication method for a color filter panel of a display device, comprising:
   forming a black matrix layer having a first opening on a substrate;
   forming a color filter layer on the substrate;
   forming an organic layer on the color filter layer and in the first opening; and
   forming a spacer by back-exposing the organic layer to a light through the first opening using the black matrix and the color filter layer as a photomask.

2. A fabrication method for a color filter panel of a display device, comprising:
   forming a black matrix layer having first opening on substrate;
   forming color filter layer on the substrate;
   forming an organic layer on the color filter layer and in the first opening;
   forming a spacer by back-exposing the organic layer through the first opening; and
   forming a second opening on the first opening and between parts of the color filter layer, wherein the spacer is formed by back-exposing the organic layer through the first and second openings.

3. The method of claim 2, wherein a size of the second opening is equal to or greater than a size of the first opening.

4. The method of claim 1, further comprising:
   forming an overcoat layer on the color filter layer; and
   forming an alignment layer on the spacer.

5. The method of claim 1, further comprising:
   forming a common electrode on the color filter layer; and
   forming an alignment layer on the common electrode and the spacer.

6. The method of claim 1, wherein the step of forming the spacer comprises:
   back exposing the organic layer through the first opening; and
   developing the exposed organic layer.

7. A fabrication method for a color filter panel of a display device, comprising:
   forming a black matrix layer having a first opening on a substrate;
   forming color filter layer on the substrate;
   forming an organic layer on the color filter layer and in the first opening; and
   forming a pacer by back-exposing the organic layer through the first opening; and
   wherein in the step of forming the color filter layer, the color filter layer includes an ultraviolet ray absorbent material.

8. A fabrication method for a color filter panel of a display device, comprising:
   forming a black matrix layer having first opening on a substrate;
   forming a color filter layer on the substrate;
   forming an organic layer on the color filter layer and in the first opening; and
   forming a spacer by back-exposing the organic layer through the first opening; and
   wherein in the step of forming the spacer, the back-exposing is performed by using a glass filter.

9. The method of claim 8, wherein the glass filter blocks a wavelength of at least 360 nm.

10. The method of claim 5, wherein the spacer is formed directly on the common electrode.

11. The method of claim 6, wherein the spacer is formed directly on a common electrode.

* * * * *

UNITED STATES PATENT AND TRADEMARK OFFICE
CERTIFICATE OF CORRECTION

PATENT NO. : 7,123,333 B2 Page 1 of 1
APPLICATION NO. : 10/825414
DATED : October 17, 2006
INVENTOR(S) : Dong-Hoon Lee et al.

It is certified that error appears in the above-identified patent and that said Letters Patent is hereby corrected as shown below:

On the Title page, item [30]

Please change:
Foreign Application Priority Data (30)
November 24, 2003 "(JP)" 10-2003-0083772
 to
Foreign Application Priority Data (30)
November 24, 2003 --(KR)-- 10-2003-0083772

Signed and Sealed this

Thirtieth Day of January, 2007

JON W. DUDAS
*Director of the United States Patent and Trademark Office*